March 20, 1956 C. H. REYNOLDS 2,738,806
PRESSURE CONTROL APPARATUS
Filed May 8, 1952
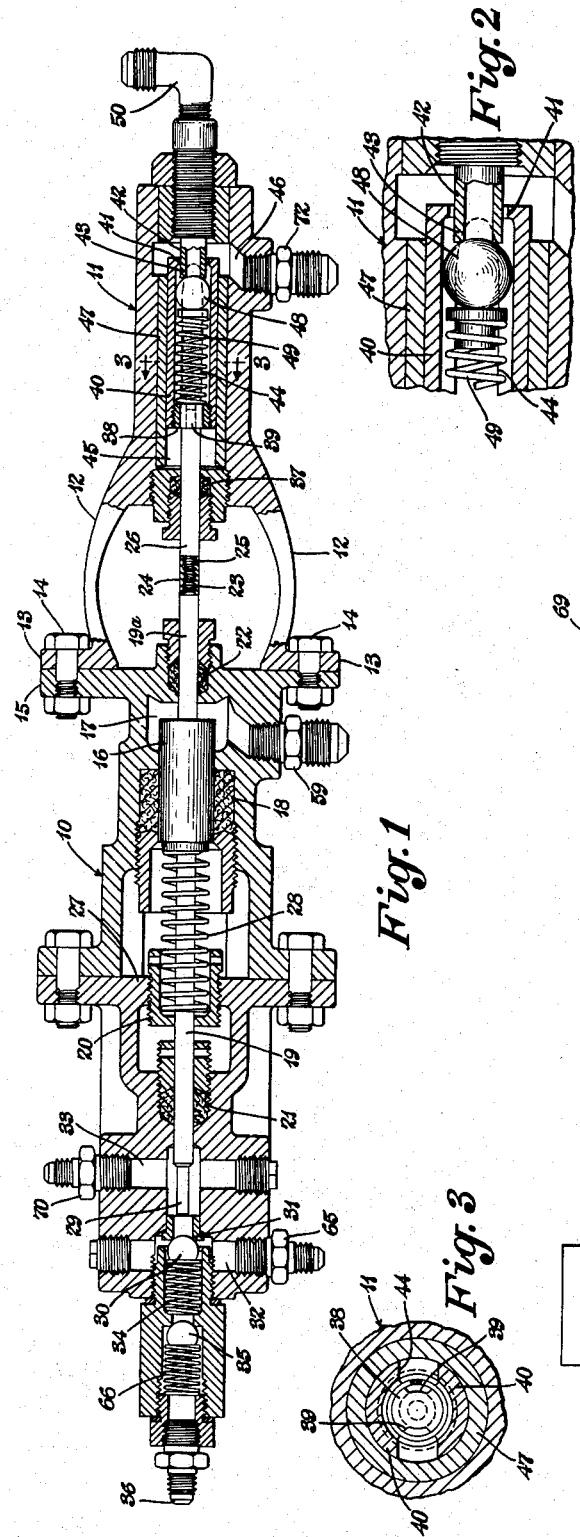
INVENTOR.
Charles Herbert Reynolds
BY
Frease & Bishop
ATTORNEYS

United States Patent Office 2,738,806
Patented Mar. 20, 1956

2,738,806

PRESSURE CONTROL APPARATUS

Charles Herbert Reynolds, Canton, Ohio; Nancy Elsie Reynolds, administratrix of said Charles Herbert Reynolds, deceased, assignor to Nancy Elsie Reynolds, Canton, Ohio Application May 8, 1952, Serial No. 286,706

1 Claim. (Cl. 137—595)

The invention relates to fluid pressure control apparatus, and especially to a control apparatus actuated by fluid under pressure for regulating the apparatus which produces the fluid pressure.

The invention is particularly adapted for application to a pressure system in which water is heated and discharged through a nozzle. Needle valves are commonly employed in pressure control apparatus of this character, but they have proven highly unsatisfactory due to the fact that they frequently become clogged with dirt, lime deposits from hard water, and other foreign matter which prevents the needle valve from closing, thus rendering the control apparatus inoperative.

The present invention has for its object the provision of a control apparatus which does not rely upon a needle valve for controlling the by-passing of water around the heating means.

Another object is to provide such a pressure control device in which the flow of both the fuel and the water are controlled by ball valves which will operate satisfactorily under all conditions.

A further object is the provision of a novel type of ball valve for controlling the by-passing of water around the heating means.

A still further object of the invention is to provide a control device having such ball valve provided with means for pulling the ball away from its seat, rather than the conventional type of ball valve in which the ball is pushed away from its seat.

The above and other objects, apparent from the drawing and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawing, in which:

Fig. 1 is a longitudinal, sectional view of the pressure control apparatus embodying the invention;

Fig. 2 an enlarged, fragmentary, sectional view of the improved ball valve which controls the by-passing of water around the heating means;

Fig. 3 an enlarged, transverse, sectional view, taken as on the line 3—3, Fig. 1; and, Fig. 4 a diagrammatic view showing the application of the fluid pressure control apparatus comprising the invention employed with a hot water pressure system.

The pressure control apparatus to which the invention relates comprises two casings indicated generally at 10 and 11, rigidly connected together in longitudinal alignment as by the rigid arms 12 formed upon the casing 11 and having out-turned ears 13 connected as by the bolts 14 to the flange 15 at the opposed end of the casing 10.

The control is obtained through the operation of the plunger 16 reciprocably mounted in the casing 10, one end thereof extending into the pressure chamber 17 formed in said casing, the other end of the plunger being slidably located through the packing gland 18.

The plunger 16 is mounted intermediate the ends of a rod, one end portion 19 of which is slidably located through the tubular adjusting nut 20 and the packing gland 21, the other end 19a thereof being slidably located through the packing gland 22 and having the reduced, threaded terminal end 23 which is connected, as by the threaded coupling 24, with a similar threaded end 25 of the rod 26.

The tubular adjusting nut 20 is threaded through a partition wall 27 in the casing 10 and is adapted to be adjusted therein to adjust the tension upon the coil spring 28 which is interposed between the nut 20 and the plunger 16.

The reduced end 29 of the portion 19 of the rod is adapted to be projected to the left, as viewed in Fig. 1, to unseat the ball 30 from the seat 31, so as to form communication between the fuel inlet chamber 32 and fuel outlet chamber 33.

The ball 30 is normally held upon the seat 31 as by the coil spring 34. Normally, fuel entering the chamber 32 will unseat the check valve 35 and pass out through the outlet 36.

Within the casing 11, the rod 26 is slidably mounted through the packing gland 37 and has the nut 38 threaded upon its inner end. This nut is cut away on opposite sides, as at 39, and is threaded into the reciprocating cylinder 40, having the internal, annular rib 41 at its opposite end normally located around the outlet tube 42 which is provided at its inner end with the valve seat 43.

The cylinder 40 is cut away on each side as at 44, registering with the cut-out portions 39 of the nut 38 so as to form communication between the chamber 45 at the inner end of the cylinder and the water inlet chamber 46, to prevent the formation of a water cushion in the chamber 45 which might interfere with movement of the cylinder 40. A bushing 47 is provided in the casing 11 within which the cylinder 40 reciprocates.

Located within the cylinder 40 is the water control ball valve 48, normally held seated upon the valve seat 43 by means of the coil spring 49. A water outlet 50 communicates with the outlet tube 42.

In Fig. 4 is shown diagrammatically the improved pressure control apparatus applied to a hot water pressure system. Cold water may be pumped from a water tank 51, by means of the water pump 52, through the coil 53, which is heated as by the burner 54, the hot water being delivered under pressure from the coil through the pipe 55 to a hose line or nozzle, and preferably having the valve 56 in said line.

A pipe 57 is connected to the line 55 as by the T-coupling 58 and communicates with the pressure chamber 17 of the pressure control apparatus through the coupling 59. A return pipe 60 is connected to the outlet connection 50 of the pressure control apparatus and leads back to the water tank 51.

Fuel oil is drawn from the fuel tank 61, through a pipe 62 to the fuel pump 63 and is pumped through the pipe 64 to the fuel inlet chamber 32, of the pressure control apparatus, the pipe 64 being connected to said fuel inlet chamber as by the coupling 65.

The fuel entering the inlet chamber 32 of the pressure control apparatus, under pressure, dislodges the check ball valve 35, against the pressure of its spring 66, the fuel oil passing out through the coupling 36 and pipe 67 to the burner 54. Any conventional electric sparking device, as indicated generally at 68, may be provided for igniting the fuel at the burner.

A fuel return pipe 69 is connected to the coupling 70, at the fuel outlet chamber 33 of the pressure control apparatus, and leads back to the fuel tank. The cold water pipe 71 leads from the discharge side of the water pump 52 to the inlet chamber 46 of the pressure control device, being connected thereto as by the coupling 72.

In the operation of the improved pressure control apparatus, the adjusting nut 20 is adjusted to place the desired tension upon the spring 28. This tension may be regulated so as to permit the plunger 16 to be operated at any desired pressure.

The hot water under pressure in the pressure chamber 17 will be subject to the ordinary pulsations of the pump and may cause a continuous slight reciprocation of the plunger 16. This reciprocation of the plunger is not sufficient to move the plunger sufficiently to the left to engage the ball valve 48 by the internal, annular rim 41 of the cylinder 40, so that the ball valve 48 will remain closed until the pressure in the line 55 reaches a predetermined point at which time the plunger 16 will be moved to the left, as viewed in Fig. 1, moving the cylinder 40 therewith, through the rods 19a and 26, the internal annular rib 41 at the end of the cylinder engaging the ball 48 and pulling it away from its seat 43, permitting cold water from the pipe 71 to pass through the inlet chamber 46 of the pressure control apparatus and then out through the outlet connection 50 and return pipe 60 to the water tank 51 or other source of water supply.

At the same time, the reduced end 29 of the rod 19 will contact the ball valve 30 and move it away from its seat 31, permitting the fuel oil from the fuel pump, which enters the inlet chamber 32 through the pipe 64, to pass through the outlet chamber 33 and through the coupling 70 and return pipe 69 to be returned to the fuel tank. The fuel thus by-passes the check valve 35 as it follows the course of least resistance so that fuel to the burner 54 is cut off.

The parts remain in these positions until the pressure of the hot water drops below the predetermined point, at which time the spring 28 will move the plunger 16 back to the normal position shown in Fig. 1, permitting the ball valve 30 to be again seated upon its seat 31, by pressure of its spring 34, and permitting the ball 48 to be again seated upon its seat 43 by pressure of its spring 49. Thus the by-passing of both the water and the fuel oil are stopped and fuel oil is again admitted to the burner and ignited by the sparking device 68 and the operation will continue as above described.

With the pressure control apparatus of the character described, provided with the novel ball valve as shown in detail in Fig. 2, for controlling the by-passing of cold water around the heating coil, the disadvantages and difficulties inherent in a needle valve are overcome. The ball 48 will properly seat upon its seat 43, regardless of any dirt or other foreign matter, so that the by-passing of the water will always be stopped at the moment the pressure drops below the predetermined point.

I claim:

A pressure control apparatus comprising a housing having a pressure chamber therein, a second chamber on one side of the pressure chamber and a third chamber on the other side of the pressure chamber, a piston having one end extending into the pressure chamber, a fluid inlet in the pressure chamber for admitting fluid pressure against said one end of the piston, spring pressure means against the other end of the piston, an inlet in the second chamber, an outlet tube extending into the outer end of the second chamber, a valve seat at the inner end of said outlet tube, inlet and outlet connections in the third chamber, coaxial plunger rods connected to opposite ends of the piston, a tubular cylinder connected at one end to one of said plunger rods, the other end of said tubular cylinder normally located around said outlet tube, a ball movably mounted in the tubular cylinder, a coil spring in the tubular cylinder normally seating the ball on said valve seat, an internal annular rib in said other end of the tubular cylinder for withdrawing the ball from the valve seat when the plunger is reciprocated in a direction away from said second chamber, a valve seat in the third chamber interposed between the inlet and outlet connections therein, a spring biased ball normally seated on said last named valve seat, and a reduced end upon the other plunger rod for pushing the last named ball from its seat.

References Cited in the file of this patent

UNITED STATES PATENTS

| | | |
|---|---|---|
| 692,172 | Wescott et al. | Jan. 28, 1902 |
| 983,101 | Weber | Jan. 31, 1911 |
| 998,585 | Milner | July 18, 1911 |
| 1,192,587 | Watson | July 25, 1916 |
| 1,466,116 | Campbell | Aug. 28, 1923 |
| 1,693,676 | Spinelle | Dec. 4, 1928 |
| 1,709,095 | Protzeller | Apr. 16, 1929 |
| 1,731,145 | MacMillin | Oct. 8, 1929 |
| 2,011,314 | Folmsbee | Aug. 13, 1935 |
| 2,084,707 | Robinson | June 22, 1937 |
| 2,171,240 | Hinsch | Aug. 29, 1939 |
| 2,232,359 | Barks | Feb. 18, 1941 |
| 2,241,747 | Shaw | May 13, 1941 |
| 2,343,806 | Scofield | Mar. 7, 1944 |
| 2,405,466 | Tabb | Aug. 6, 1946 |
| 2,406,284 | Fitch | Aug. 20, 1946 |

FOREIGN PATENTS

| | | |
|---|---|---|
| 17,847 | Great Britain | 1896 |
| 444,760 | Italy | 1949 |